(12) United States Patent
Prakah-Asante et al.

(10) Patent No.: US 9,630,555 B1
(45) Date of Patent: Apr. 25, 2017

(54) DRIVER ALERT SYSTEM FOR SPEED AND ACCELERATION THRESHOLDS

(71) Applicant: FORD GLOBAL TECHNOLOGIES, LLC, Dearborn, MI (US)

(72) Inventors: Kwaku O. Prakah-Asante, Commerce Township, MI (US); Radhakrishnan Swaminathan, Grand Blanc, MI (US); Michael A. Blommer, Ann Arbor, MI (US); Reates Curry, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/005,423

(22) Filed: Jan. 25, 2016

(51) Int. Cl.
*B60Q 9/00* (2006.01)
*B60Q 1/44* (2006.01)
*B60Q 1/54* (2006.01)

(52) U.S. Cl.
CPC ............... *B60Q 9/00* (2013.01); *B60Q 1/444* (2013.01); *B60Q 1/54* (2013.01)

(58) Field of Classification Search
CPC ............. B60Q 9/00; B60Q 1/444; B60Q 1/54
USPC ........................................................ 340/441
See application file for complete search history.

(56) References Cited

U.S. PATENT DOCUMENTS

| 5,905,460 A | 5/1999 | Odagiri et al. |
| 8,258,934 B2 | 9/2012 | Filev et al. |
| 9,037,125 B1 | 5/2015 | Kadous |
| 2005/0083211 A1* | 4/2005 | Shafir ............... G01C 21/3697 340/905 |
| 2005/0232469 A1* | 10/2005 | Schofield ........... G06K 9/00818 382/104 |
| 2008/0238667 A1* | 10/2008 | Olson ............... G06K 19/0723 340/541 |
| 2009/0259365 A1* | 10/2009 | Rohlfs ................ B62D 15/028 701/41 |
| 2010/0045452 A1* | 2/2010 | Periwal .................... B60Q 9/00 340/439 |
| 2011/0187522 A1* | 8/2011 | Filev .................... B60W 50/16 340/441 |
| 2012/0139816 A1* | 6/2012 | King ....................... B60Q 9/00 345/7 |

(Continued)

FOREIGN PATENT DOCUMENTS

TW M416117 U1 11/2011
WO 2014047695 A2 4/2014

OTHER PUBLICATIONS

Bradley Berman, When the Smartwatch Meets the "Smart" Car, Jun. 19, 2014, http://readwrite.com/2014/06/19/mercedes-cla-pebble-smartwatch-drivestyle-integration.

*Primary Examiner* — Joseph Feild
*Assistant Examiner* — Omar Casillashernandez
(74) *Attorney, Agent, or Firm* — Frank A. MacKenzie; MacMillan, Sobanski & Todd, LLC

(57) ABSTRACT

A system for alerting drivers when a vehicle is or may be likely to be traveling in excess of a speed limit is provided. The system evaluates vehicle speed and provides custom warnings for various speed-related occurrences including a prediction that based on an instantaneous speed and acceleration the vehicle is about to exceed the speed limit. Haptic feedback from a wearable device such as a smart watch may preferably provide distinct intensities of warning between actual and predicted excursions over a limit.

12 Claims, 3 Drawing Sheets

(56) References Cited

U.S. PATENT DOCUMENTS

| | | | |
|---|---|---|---|
| 2013/0300552 A1* | 11/2013 | Chang | B60Q 9/00 340/436 |
| 2014/0253309 A1* | 9/2014 | Faeuster | B62D 15/025 340/438 |
| 2014/0335902 A1 | 11/2014 | Guba et al. | |
| 2015/0094951 A1 | 4/2015 | Gepner et al. | |
| 2015/0154886 A1* | 6/2015 | Aldossary | G09B 21/001 434/114 |
| 2015/0253146 A1* | 9/2015 | Annapureddy | G01C 21/36 701/490 |
| 2016/0167578 A1* | 6/2016 | Park | G08G 1/16 340/435 |
| 2016/0334901 A1* | 11/2016 | Rihn | G06F 3/044 |

* cited by examiner

DRIVER ALERT SYSTEM FOR SPEED AND ACCELERATION THRESHOLDS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to alerting drivers when a vehicle is or may be likely to be traveling in excess of a speed limit, and, more specifically, to a predictive system for evaluating vehicle speed and providing custom warnings for various speed-related occurrences.

Driver assistance systems are known that are capable of monitoring vehicle speed and/or acceleration to present a warning to the driver in the event that a speed or acceleration limit has been exceeded. As shown in U.S. Pat. No. 8,258,934, for example, a warning may be generated using a haptic device, heads-up display, audio warning device, or other indicators. In addition to warnings based on exceeding a speed or acceleration limit, warnings may be generated based on proximity to intersections or an approaching curve in the roadway.

Depending on how a warning system is implemented, concerns may arise in which a distraction created by the warning system may reduce the system effectiveness. The efficacy of a warning may depend significantly on its timeliness and its ability to present an easily understood representation of the type and urgency of a particular warning.

SUMMARY OF THE INVENTION

In one aspect of the invention, an alert system is provided for a driver of a road vehicle. A speed circuit generates an instantaneous speed of the vehicle. A limit setting circuit identifies a speed threshold. A warning controller is coupled to the speed circuit and the limit setting circuit. The warning controller determines an instantaneous acceleration corresponding to the instantaneous speed and an estimated time-to-threshold in response to the instantaneous acceleration and instantaneous speed. The warning controller generates a predicted excursion warning to the driver if the time-to-threshold is less than a predetermined time. A warning generated when the speed threshold is actually exceeded is preferably presented with a greater intensity than the warning of a predicted excursion.

DETAILED DESCRIPTION OF PREFERRED EMBODIMENTS

Figure 1:
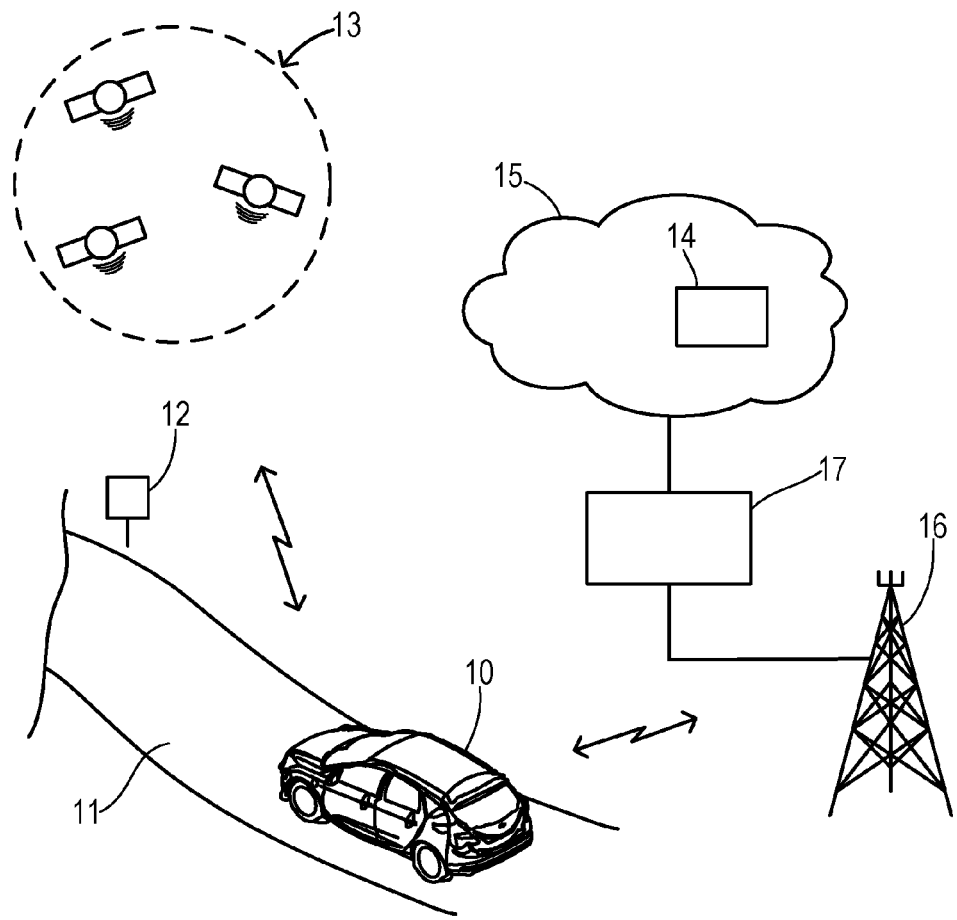
FIG. 1 is a diagram showing a vehicle and wireless systems for interacting with the vehicle in one embodiment for monitoring vehicle speed and identifying relevant speed limits.

Referring to FIG. 1, a road vehicle 10 travels on a roadway 11 for which a lawful speed limit 12 is posted. In the present invention, warnings are associated with a speed threshold that can correspond to posted speed limit 12 or a user-specified speed (e.g., an absolute maximum speed regardless of where the vehicle is traveling or a speed set by a parent or supervisory person that can vary according to the specific roadway or type of roadway). In order to determine a current value for a relevant lawful speed limit, conventional systems have used a camera for capturing an image of signage posting the speed limit. They have also used a global positioning system (GPS) to determine a location/roadway by receiving GPS signals from GPS satellites 13, and have then used the location/roadway identification to look-up a speed limit in a database. The database may be pre-loaded into a navigation database stored in the vehicle or may be retrieved from a remote server 14 in a cloud network 15 via a cellular data network 16 coupled to network 15 by a gateway 17. Once the speed limit associated with roadway 11 (or other speed threshold, such as a speed selected for safely driving through a curve that has been detected in the path of vehicle 10) has been determined, conventional systems have compared the actual speed of the vehicle (e.g., as determined by a powertrain control module or using GPS) to the speed limit/threshold and then generated a warning when the limit is exceeded.

In the present invention, a predictive warning is included which can be issued prior to the occurrence of any actual violation of a speed limit or threshold by monitoring both instantaneous speed and acceleration and detecting a condition in which an excursion over the limit would soon occur if the acceleration does not decrease. Preferably, the predictive warning can be combined with warnings of actual excursions but using distinct indicators or intensity of the warning to communicate different urgency.

Figure 2:
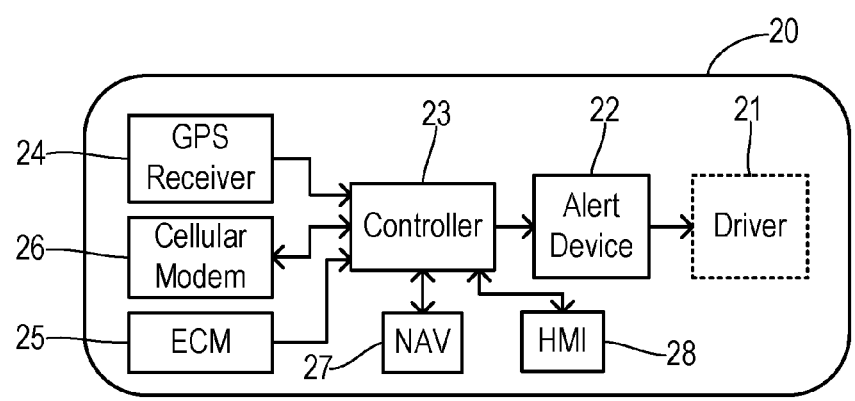
FIG. 2 is a block diagram showing an embodiment of the invention with an alert system integrated with a vehicle.

As shown in FIG. 2, a first embodiment of the invention is integrated in a road vehicle 20 such as a gasoline-powered, hybrid, or full electric vehicle. Vehicle 20 is operated by a driver 21 via the usual controls such as an accelerator pedal (not shown). An alert device or indicator 22 is provided for producing a warning perceptible by the driver 21. Warning events may include visible indicators such as lights or text messages on any display or may include audible events such as warning tones. Most preferably, alert device 22 may include a vibratory transducer in a wearable device or mounted in a vehicle surface in contact with driver 21 (e.g., accelerator pedal or steering wheel) for generating haptic feedback in the form of sensible vibrations.

A controller 23 activates alert device 22 according to various conditions monitored via a GPS receiver 24, a powertrain or engine control module (ECM) 25, and a cellular modem 26. In particular, controller 23 monitors instantaneous speeds of vehicle 20 using speed data from either ECM 25 based on a powertrain sensor or from GPS receiver 24 which determines speed by monitoring changing GPS position coordinates. Controller 23 further determines a relevant lawfully-prescribed speed limit or a manually-configured maximum speed applicable to the roadway being traversed or corresponding to other factors such as the age or identity of the driver or road or weather conditions (both of which are referred to herein as a speed threshold). The lawful speed limit can be identified by transmitting a current GPS location to a remote server database via cellular modem 26. Alternatively, a navigation system 27 may be configured with a map database which includes speed limits, or a manual setting may be obtained using a human-machine interface (HMI) 28.

Figure 3:
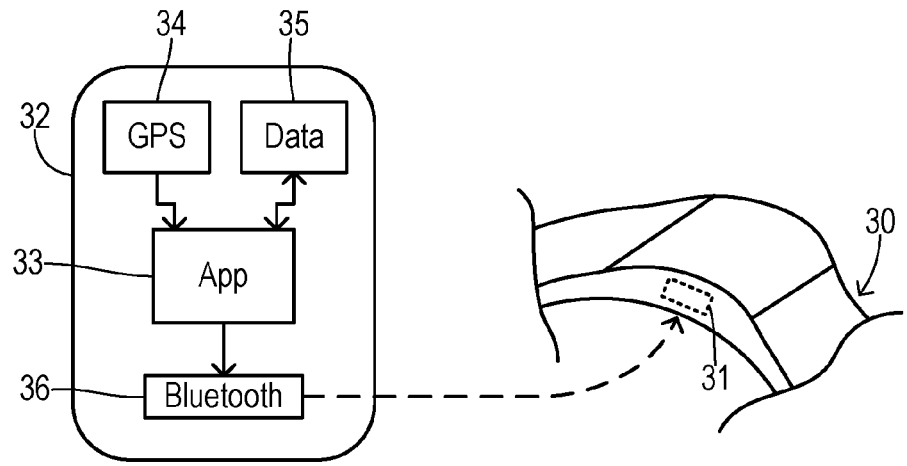
FIG. 3 is a block diagram showing an embodiment of the invention contained in a personal mobile device such as a smart watch and/or a smart phone.

FIG. 3 shows alternative embodiments implemented using one or more personal wireless devices such as a smart watch 30 and a mobile cellular telephone or smartphone 32. The warning controller and the warning indicator may be self-contained in just smart watch 30 or just smartphone 32, or the two can be divided between the two devices with communication performed using a Bluetooth connection, for example.

A haptic transducer 31 is shown in watch 30 which is controlled by a software application 33 which interacts with a GPS receiver 34 and a cellular data connection 35. In the segregated embodiment, a Bluetooth node 36 connects smartphone 32 with watch 30 in order to appropriately activate haptic transducer 31.

Figure 4:
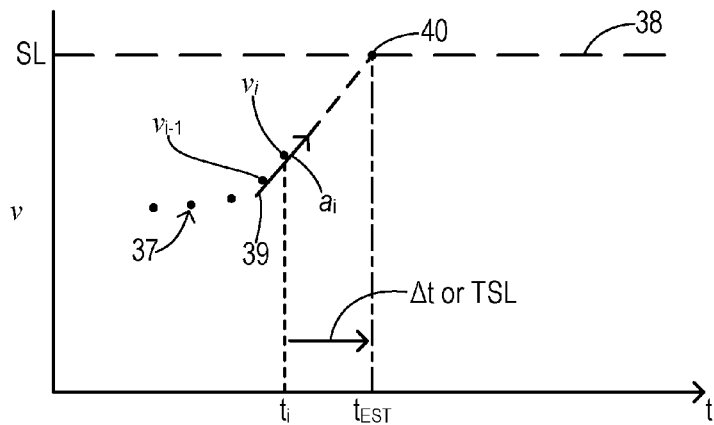
FIG. 4 is a diagram illustrating a changing vehicle speed and a determination of an estimated time until a speed limit is reached.

FIG. 4 illustrates the predictive aspect of the present invention wherein successive speed measurements v are regularly sampled at respective sample times i. Any change between the most recent instantaneous speed measurement $v_i$ and an immediately preceding speed $v_{i-1}$ determines an instantaneous acceleration $a_i$ (i.e., the slope between speed measurements) as indicated by an arrow 39. A speed limit or threshold 38 is greater than $v_i$ since an excursion has not yet occurred. By extending arrow 39 so that it crosses threshold 38, an estimated time $t_{EST}$ at which a speed excursion will occur is projected to be at an intersection point 40. Thus, an estimated time difference $\Delta t$ measured from $t_i$ to $t_{EST}$ signifies the amount of time until the vehicle speed would rise to and then exceed the speed limit if the present acceleration were to continue. When the estimated time grows too short, then the likelihood of exceeding the speed threshold increases and it becomes desirable to generate a warning for the driver.

Figure 5:
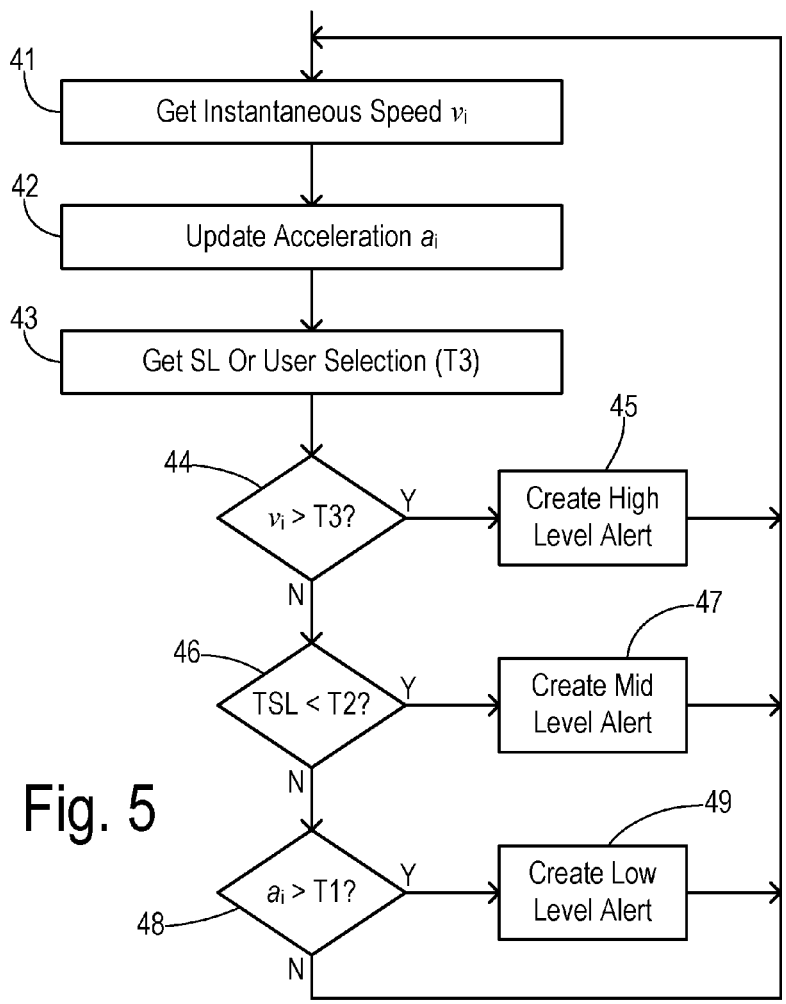
FIG. 5 is a flowchart showing one embodiment of a method for generating speed-related warnings.

FIG. 5 shows a preferred method of the invention including both predictive and instantaneous speed warnings. In step 41, instantaneous speed $v_i$ is obtained. Based on successive speeds (or based on a value maintained in the GPS receiver), an instantaneous acceleration $a_i$ is updated in step 42. A speed limit or speed threshold is identified in step 43 as a governmentally imposed lawful speed limit or a user selection (denoted at threshold T3). In step 44, a check is performed to determine whether instantaneous speed $v_i$ is greater than speed threshold T3. If so, then a high level alert is created in step 45. Preferably, a high level alert employs a highest intensity of warning generated by the chosen indicator, e.g., a highest magnitude of haptic vibration, a loudest volume level for a warning tone, or the like. After the high level alert is generated, a return is made to step 41 in order to continue monitoring by re-determining the speed threshold and instantaneous speed and acceleration. If threshold T3 is not exceeded, then the method proceeds to step 46 wherein estimated time $t_{EST}$ (i.e., a time-to-speed-limit or TSL) is compared to a time threshold T2. Threshold T2 may be about 3 seconds, for example. If time TSL is less than threshold T2, then a mid-level alert is generated in step 47. If no mid-level alert is needed, then a check is made in step 48 to determine whether instantaneous acceleration $a_i$ is greater than an acceleration threshold T1. If so, then a low level alert is generated in step 49.

Figure 6:
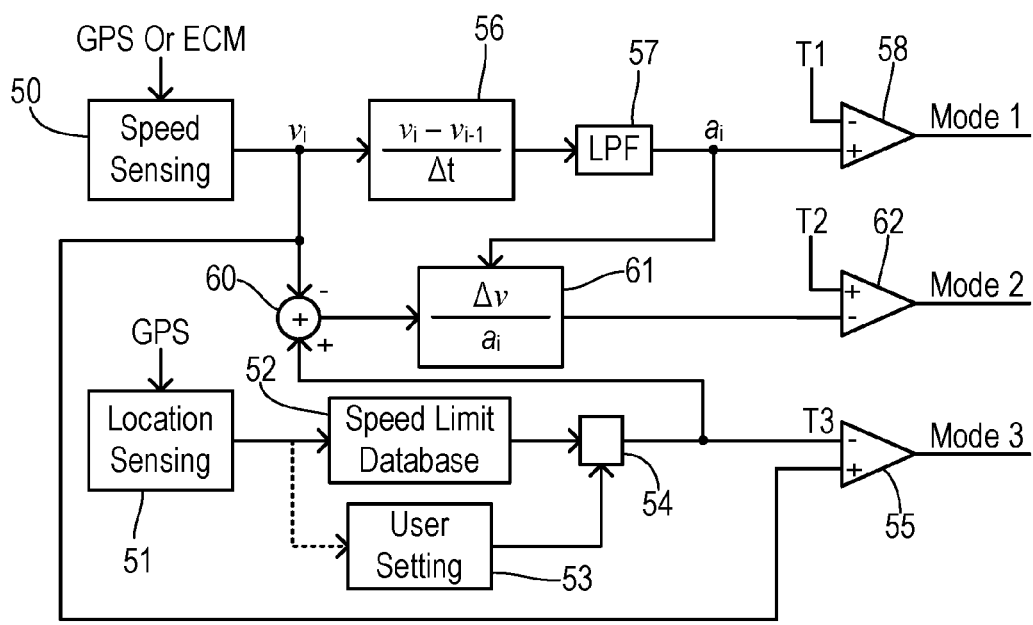
FIG. 6 is a block diagram showing one embodiment of a warning controller of the invention.

FIG. 6 is a block diagram of an embodiment of the invention that can be implemented using discrete circuits, integrated circuits, a programmable gate array, or as an algorithm in a general purpose processor, for example. A speed sensing circuit or block 50 provides an instantaneous speed of the vehicle $v_i$ in response to data from a GPS receiver or a powertrain controller. A location sensing block 51 receives data from a GPS receiver and provides location coordinates to a speed limit database 52 for looking up a roadway/street and the corresponding mandated speed limit. The speed limit is input to a selection circuit 54. Another input of selection circuit 54 is configured to receive a user-specified speed threshold from a setting circuit 53. The manual threshold may be configured to apply regardless of the vehicle location or it can additionally depend on the location coordinates (e.g., the type of roadway) in determining what user-specified value to use. Selection circuit 54 responds to the user setting so that such that the governmental speed limit is used except when overridden by a user-configured threshold. The limit selected by circuit 54 is coupled to an inverting input of a comparator 55 as a threshold T3 and to an adding input of a summer 60. A non-inverting input of comparator 55 receives the instantaneous speed signal $v_i$. When instantaneous speed $v_i$ exceeds threshold T3, comparator 55 generates the highest level alert (i.e., a Mode 3 alert signal) which is coupled to an indicator (not shown) for using a highest intensity to warn the driver of the speed excursion.

An acceleration block 56 also receives instantaneous speed $v_i$. Consecutive speed values (e.g., $v_i$ and $v_{i-1}$) are stored in block 56 to support a calculation of the acceleration as the slope between the successive values. To reduce the potential impact of spurious noise effects, a low pass filter 57 smooths the output of block 56 to provide an instantaneous acceleration $a_i$ to a non-inverting input of a comparator 58 and to an input of a predicted excursion block 61. An inverting input of comparator 58 receives a first threshold T1 which may preferably be comprised of a manufacturer determined acceleration threshold which is set to discourage inappropriate driving behavior. When instantaneous acceleration $a_i$ exceeds threshold T1, comparator 58 generates the lowest level alert (i.e., a Mode 1 alert signal) which is coupled to the indicator (not shown) for using a lowest intensity to warn the driver of the acceleration excursion.

Instantaneous speed $v_i$ is coupled to a subtracting input of summer 60 so that the difference ($\Delta v$) between instantaneous speed $v_i$ and the selected speed limit (SL) is provided to an input of prediction block 61, wherein the speed difference $\Delta v$ is divided by the current acceleration $a_i$ in order to estimate the time-to-speed-limit (TSL). The estimate is coupled to an inverting input of a comparator 62. A non-inverting input of comparator 62 receives a second threshold T2 which may preferably be comprised of a fixed value, such as about three seconds. A TSL value less than T2 indicates that a speed limit excursion may be likely to occur so soon that it may be difficult for the driver to avoid exceeding the speed limit. When the TSL is less than threshold T3, comparator 62 generates the medium level alert (i.e., a Mode 2 alert signal) which is coupled to the indicator (not shown) for using a medium intensity to warn the driver of the predicted speed excursion.

What is claimed is:

1. An alert system for a driver of a road vehicle, comprising:

a speed circuit generating an instantaneous speed of the vehicle;

a limit setting circuit identifying a speed threshold;

a warning controller coupled to the speed circuit and the limit setting circuit, wherein the warning controller 1) determines an instantaneous acceleration corresponding to the instantaneous speed, 2) determines an estimated time-to-threshold in response to the instantaneous acceleration and instantaneous speed, and 3) generates a predicted excursion warning to the driver if the time-to-threshold is less than a predetermined time; and an indicator responsive to the warning controller for producing the predicted excursion warning as an event sensible by the driver;

wherein the warning controller generates an excessive speed warning if the instantaneous speed is greater than the speed threshold, wherein the indicator produces the excessive speed warning as another event sensible by the driver, wherein the sensible events for the predicted excursion warning and the excessive speed warning have respective intensities, and wherein the intensity for the excessive speed warning is greater than the intensity for the predicted excursion warning; and wherein the warning controller generates an excessive acceleration warning if the instantaneous acceleration is greater than an acceleration threshold, wherein the indicator produces the excessive acceleration warning as another event sensible by the driver, wherein the sensible events for the predicted excursion warning and the excessive acceleration warning have respective intensities, and wherein the intensity for the excessive acceleration warning is less than the intensity for the predicted excursion warning.

2. The alert system of claim 1 wherein the indicator is a wearable device, and wherein the event is comprised of vibrations coupled from the wearable device to the driver.

3. The alert system of claim 1 wherein the indicator includes a transducer carried in the vehicle to generate audible and visible warning events.

4. The alert system of claim 1 wherein the speed circuit is comprised of a GPS receiver for monitoring position of the vehicle.

5. The alert system of claim 4 wherein the limit setting circuit is comprised of a database storing roadway locations and associated lawful speed limits, and wherein the speed threshold is comprised of the lawful speed limit corresponding to a roadway corresponding to the monitored position of the vehicle.

6. The alert system of claim 5 wherein the GPS receiver is contained in a wearable device, and wherein the wearable device includes a wireless data system for accessing the database.

7. The alert system of claim 1 wherein the limit setting circuit is comprised of an interface for manually configuring the speed threshold.

8. The alert system of claim 1 wherein the speed circuit is comprised of a powertrain controller of the vehicle.

9. A wireless alerting system carried in a vehicle, comprising:

a GPS receiver monitoring vehicle location and characterizing instantaneous speed and acceleration from within the vehicle;

a controller identifying a speed limit for the location and calculating an estimated time to reach the speed limit; and a haptic transducer generating a predicted excursion warning to the driver when the estimated time is less than a predetermined time, wherein the haptic transducer generates an excessive speed warning if the instantaneous speed is greater than the speed limit and an excessive acceleration warning if the instantaneous acceleration is greater than an acceleration threshold;

wherein each warning has a respective intensity, wherein the intensity for the excessive speed warning is greater than the intensity for the predicted excursion warning, and wherein the intensity for the predicted excursion warning is greater than the intensity for the excessive acceleration warning.

10. The system of claim 9 wherein the haptic transducer is mounted in a smart watch wearable by a driver of the vehicle.

11. A method of speed monitoring of a vehicle, comprising:

determining an instantaneous speed of the vehicle;

determining an instantaneous acceleration of the vehicle;

identifying a speed limit applicable to operation of the vehicle at its current location;

determining an estimated time-to-limit in response to the instantaneous acceleration and instantaneous speed;

generating a predicted excursion warning to the driver if the time-to-limit is less than a predetermined time;

generating an excessive speed warning if the instantaneous speed is greater than the speed limit; and generating an excessive acceleration warning if the instantaneous acceleration is greater than an acceleration threshold, wherein each warning is comprised of a driver sensible event produced by an indicator having a respective intensity, wherein the intensity for the excessive speed warning is greater than the intensity for the predicted excursion warning, and wherein the intensity for the predicted excursion warning is greater than the intensity for the excessive acceleration warning.

12. The method of claim 11 wherein the indicator is comprised of a driver wearable device producing the sensible events as vibrations.

\* \* \* \* \*